July 4, 1961 D. E. HAASE ET AL 2,990,741
CONTROL SYSTEM FOR ROTARY CUTTER
Filed Oct. 6, 1958
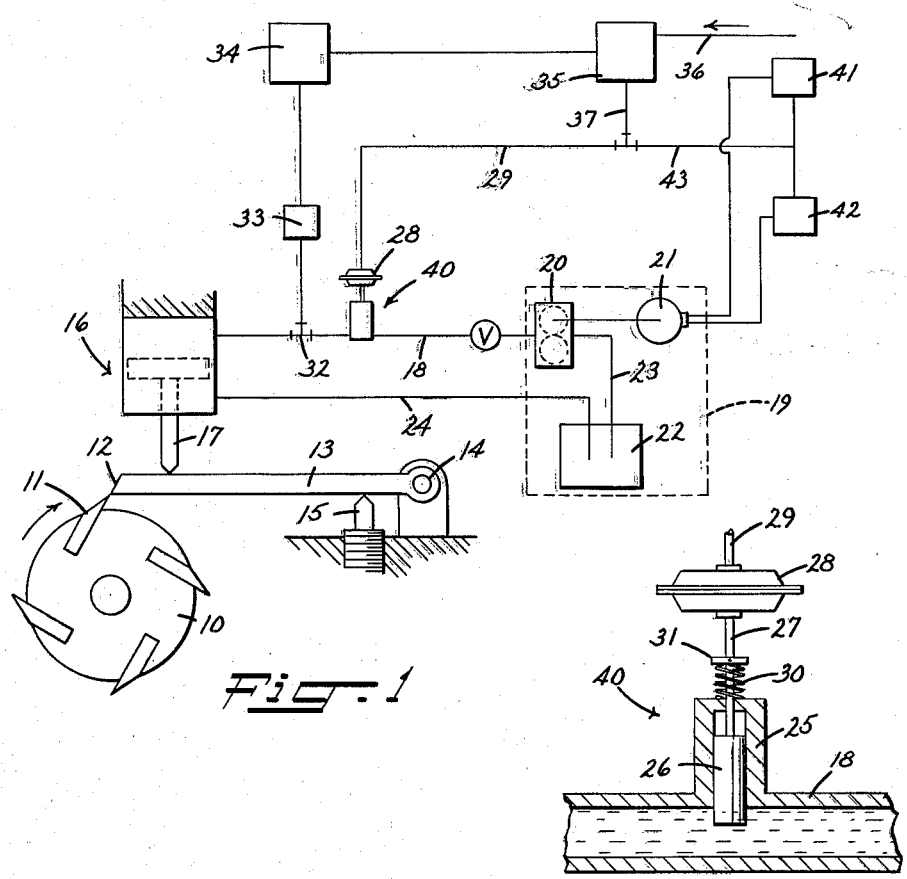
Fig. 1
Fig. 3
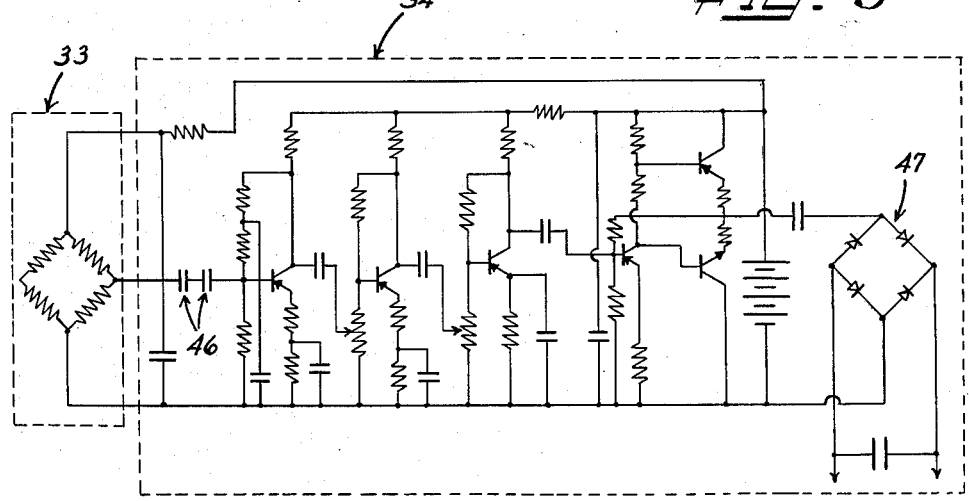
Fig. 2

United States Patent Office 2,990,741
Patented July 4, 1961

2,990,741
CONTROL SYSTEM FOR ROTARY CUTTER
Donald E. Haase and Oliver J. Smith III, Media, Pa., assignors to American Viscose Corporation, Philadelphia, Pa., a corporation of Delaware
Filed Oct. 6, 1958, Ser. No. 765,611
8 Claims. (Cl. 83—72)

This invention relates to a system for maintaining constant a desired amount of interference between a rotating element and a relatively stationary member and, more particularly, to a system for maintaining a constant amount of interference between the rotating blades of a rotary cutter and a stationary bed-knife with which said blades cooperate.

Cutters of the general type to which this invention particularly relates are well known and have been used extensively for cutting continuous synthetic or artificial filaments into staple fiber lengths as well as for other cutting operations. In general, such cutters comprise a rotating element usually carrying a plurality of knives which cooperate with a stationary blade or bed-knife. Desirably, a small amount of interference is maintained between the cutting edges so as to cut the material by a shearing action. With cutters of this type very close supervision has been required in order to maintain the amount of interference somewhere near the desired value because continuous operation of the cutter causes the cutting elements to become heated and expand and thereby produce a greater amount of interference and, on the other hand, as the cutting edges become worn there results a decrease in the amount of interference. The necessary adjustments for maintaining the optimum interference have generally been made manually because attempts at automatic adjustment have not proven to be entirely reliable.

It is the primary object of this invention to provide an improved control system for maintaining a constant predetermined amount of interference between a rotating element and a relatively stationary member and especially a system for automatically controlling the amount of interference between the cutting elements of a cutter of the type above referred to.

Other and further objects, features and advantages of the invention will become apparent as the description of a preferred embodiment thereof proceeds.

Referring now to the drawing:

FIGURE 1 is a schematic diagram of the control system of the present invention;

FIGURE 2 is a schematic wiring diagram of certain of the elements; and

FIGURE 3 is an enlarged diagrammatic view of one of the elements of the system.

The cutter comprises a rotatably mounted drum 10 carrying a plurality of knives 11 which cooperate with a bed-knife 12 mounted on the free end of a member or beam 13. The beam 13 is pivotally mounted at 14 upon a stationary support and extends cantilever fashion over an adjustable support 15. The bed-knife 12 is initially positioned to provide the desired amount of interference between it and the rotating blades 11 by stressing and deflecting the beam 13 over the adjustable support 15 by means of a hydraulic cylinder and piston means generally indicated at 16, the piston of which has an extension 17 which bears against the upper edge of the beam 13 near the free end thereof. Fluid pressure is supplied to the cylinder and piston 16 through a pipe or line 18 leading from a hydraulic device 19 which comprises a gear type pump 20, a reversible electric motor 21 for driving the pump and an oil sump 22 which is connected by a line 23 to the pump 20 and by a line 24 on the lower side of the cylinder and piston 16. The hydraulic device 19 is a commercially available apparatus manufactured by Oildyne, Inc., Chicago, Illinois, and has the ability of maintaining a constant amount of fluid in the line 18, which amount may be increased or decreased as desired by operating the motor 21 in one direction or the other. The arrangement thus far briefly described is described in detail and claimed in the copending application of Herman W. Hemker et al., Serial No. 720,580, filed March 11, 1958.

It will be apparent that as long as the pressure in the line 18 is maintained at a constant value, the bed-knife 12 will be held in a particular position. While this particular position may be initially adjusted to give a certain desired amount of interference between the blades 11 and 12, as the blades become worn the amount of interference will be reduced and on the other hand should the drum 10 become heated it will expand and thus create a greater amount of interference between the blades 11 and 12. The system of the present invention operates to automatically vary the position of the bed-knife 12 so as to maintain the interference at a constant amount irrespective of the amount of wear on the blades or expansion or contraction of the various parts.

Slidably mounted in a branch 25 of the pipe 18 is a displacement member 26 which may be moved, in a manner presently to be described, into and out of the pipe to different fluid displacement positions. In FIGURE 2 the member 26 is shown in approximately its normal position and it will be recognized that so long as the amount of fluid in the line 18 remains constant the pressure of the fluid in the line and in the cylinder and piston 16 to which said line is connected may be increased by moving the member 26 further into the line to thereby displace a greater volume of fluid and that the pressure may be decreased by withdrawing the member 26 partially or wholly out of the line. The member 26 has a shaft 27 which is connected at its upper end to a diaphragm mounted within a pressure-sensitive device 28, the positioning of the diaphragm and consequently of the member 26 being determined by the amount of pressure imposed on the diaphragm through a fluid supply line 29. A spring 30 extending between the upper closed end of the branch 25 and a collar 31 fixed to the shaft 27 tends to move the member 26 out of the line 18 and this tendency is opposed by the pressure in line 29. The displacement member 26 and parts intimately associated therewith may be referred to as a pressure regulating device and as such it is generally designated as 40.

As the rotating knives 11 strike the bed-knife 12 the member 13 carrying the bed-knife is caused to vibrate and these vibrations are transmitted to the fluid in the cylinder and piston 16 and in the line 18 in the form of pressure pulses the amplitude of which increases when the interference between the blades increases and decreases when the amount of interference decreases. The amplitude of the pressure pulses in the line 18 is directly proportioned to the amount of interference between the blades 11 and 12. According to this invention a mechanical sensing device 32, the particular construction of which is not of the essence of this invention, is provided in the line 18. The device 32, the sensing element of which may, if desired, be located in the upper part of the cylinder and piston 16 instead of in the line 18, is mechanically or hydraulically connected to a transducer 33 which converts the mechanical vibrations of said device into a varying direct electric current and transmits this current to an amplifier-rectifier 34. The amplifier portion of the amplifier-rectifier 34 is most conveniently used to amplify alternating current and may comprise a standard transistorized amplifier circuit as indicated in FIGURE 2. Two coupling condensers 46 block out the direct current supplied by the transducer 33 and allow only the dynamic variations to pass through. After amplification, the alternating current is reconverted to direct current by a germanium diode full wave bridge rectifier 47 and transmitted to a control instrument 35. The output of the amplifier-rectifier 34 varies directly with variation in the amplitude of the pressure pulses in line 18.

Air under pressure is supplied to the control instrument 35 through a line 36 and an air line 37 leading from said instrument communicates with the line 29 leading to the device 40. The instrument 35, which may be purchased on the open market, is so constructed as to cause a decrease of pressure in the lines 37 and 29 directly proportional to any increase in voltage supplied to the instrument by the amplifier-rectifier 34 and to increase the pressure in the lines 37 and 39 in an amount proportional to a decrease in voltage. So long as the amplitude of the pressure pulses in line 18 remains constant the direct current output of the amplifier-rectifier 34 remains constant and the pressure of the air in the lines 37 and 29 stays the same. The instrument 35 varies the pressure in the lines 37 and 29 only upon a change in the output of the detector 34.

The system as thus far reduced to practice provides a normal pressure in the line 29 of about 9 pounds per square inch and this pressure holds the displacement member 26 approximately midway into the line 18 as indicated in FIGURE 3. Should the amount of interference between the blades 11 and 12 increase for any reason, the instrument 35 reduces the pressure in the line 29 by an amount proportional to the increased interference to thus allow the member 26 to be withdrawn from the line 18 by an amount sufficient to reduce the pressure in the line 18 to the point where the bed-knife carrying beam 13 repositions the bed-knife 12 so as to reduce the interference between the blades to the point where it was before the increase. Likewise, when the interference between the blades 11 and 12 falls below the originally adjusted value, the instrument 35 increases the air pressure in the line 29 to thereby move the displacement member 26 further into the line 18 to produce an increased pressure on the fluid in said line and thereby cause the cylinder and piston 16 to deflect the beam 13 an additional amount so as to re-establish the desired amount of interference between the blades.

Normally, the system as thus far described will be sufficient to compensate for any variations in interference between the blades 11 and 12. However, under certain circumstances the interference may decrease to such an extent that even with the member 26 moved as far into the line 18 as it will go, the fluid pressure in said line and on the cylinder and piston 16 will still not be sufficient to re-establish the desired amount of interference. Also, there may be occasions when the interference between the blades 11 and 12 becomes so great that removal of the member 26 completely out of the line 18 will not reduce the pressure sufficiently to re-establish the desired amount of interference. To take care of these last-mentioned contingencies, means is provided for introducing an additional amount of fluid into the line 18 upon an abnormal decrease in interference between the blades and to withdraw fluid from the line in the event of an abnormal increase in interference between the blades. This means comprises a pair of air operated switches 41 and 42 for controlling the hydraulic pump motor 21. The line 37 supplying air to the line 29 is also connected to a line 43 operatively connected to the switches 41 and 42. It has been previously mentioned that the normal pressure in the line 37 is 9 pounds per square inch. When, due to decreased interference between the blades 11 and 12, this pressure rises to 15 pounds the displacement member 26 is moved as far into the line 18 as it will go and at this pressure the switch 41 is operated by the pressure in line 43 and starts the motor 21 running in the direction to add fluid to the line. The motor 21 will continue to run until the pressure pulses in the line 18 produced by the contact of the blades 11 against the blade 12 increase in amplitude to the point where the instrument 35 has caused a reduction in air pressure to 10 pounds. The 10 pounds of air pressure allows the displacement member 26 to be located in approximately its normal position and the reduction of pressure in the line 43 to 10 pounds operates the switch 41 to shut off the motor 21. There will now be sufficient fluid in the line 18 so that if the interference between the blades 11 and 12 again decreases, the member 26 will again be able to compensate for this decreasing interference by gradually moving further into the line 18.

Should the amount of interference between the blades 11 and 12 increase to the point where the control instrument 35 has reduced the air pressure in the line 29 to 3 pounds, the displacement member 26 will be fully withdrawn from the line 18 and will therefore be unable to decrease the pressure in said line to compensate for any further increase in interference. When the pressure in line 29 falls to 3 pounds the pressure in line 43 likewise is reduced to this same value and at the 3 pounds pressure the switch 42 is operated to start the motor 21 running in a direction to withdraw fluid from the line 18. The motor 21 continues to run in this direction until the amplitude of the pressure pulses in line 18 in response to the interfering contact between the blades 11 and 12 decreases to the point where the instrument 35 has caused an increase of air pressure in the line 29 to 8 pounds per square inch to thereby reposition the displacement member 26 substantially midway into the line 18. When the pressure in line 29 rises to 8 pounds the pressure in line 43 of course rises to the same value and at this 8 pounds pressure the switch 42 is operated to shut off the motor 21. Any further increase in interference between the blades 11 and 12 may then be compensated for as described above by again gradually withdrawing the displacement member 26.

The various devices and instruments employed in the system of the present invention which have not been described in detail may be selected from the catalogs of a number of instrument manufacturers to perform the functions attributed to them. There are a great many cutting operations where it is highly desirable and even essential that the amount of interference between the cutting surfaces be maintained constant within very close tolerances. Among the uses contemplated for the present invention is the controlling of the interference between the blades of a machine for cutting tows or bundles of contuinuous artificial filaments into very short lengths to produce what is known as floc, where it is essential to uniform cutting that the interference between the blades be maintained at a constant value. It will be seen that the present system is admirably suited for this purpose.

Having thus described a preferred embodiment of the invention, what is claimed is:

1. In a cutting apparatus, a rotary element having a plurality of blades extending from the periphery thereof so that the edges of said blades describe a circular path during rotation of said element, a bed-knife for cooperating with the blades of said rotary element, said bed-knife being carried on the free end of a beam member which has a relatively fixed end in addition to the free end, said beam member normally holding said bed-knife in approximately tangential alignment with respect to the circular path described by the blades of said rotary element, cylinder and piston means operatively engaging said beam member between the free end and the relatively fixed end thereof and serving to deflect the free end toward the axis of the rotary element to provide a desired amount of interference between the blades of said rotary element and the bed-knife, means for supplying hydraulic fluid to said cylinder and piston means, and means responsive to changes in the amount of interference between the blades of the rotary element and the bed-knife to decrease the fluid pressure in said cylinder and piston means when the amount of interference increases and to increase the fluid pressure when the amount of interference decreases.

2. In a cutting apparatus, a rotary element having a plurality of blades extending from the periphery thereof so that the edges of said blades describe a circular path during rotation of said element, a bed-knife for cooperating with the blades of said rotary element, said bed-knife being carried on the free end of a beam member which has a relatively fixed end in addition to the free end, said beam member normally holding said bed-knife in approximate tangential alignment with respect to the circular path described by the blades of said rotary element, hydraulic means operating on said beam member between the free end and the relatively fixed end thereof and serving to deflect the free end toward the axis of said rotary element to provide a desired amount of interference between the blades of said rotary element and the bed-knife, a line for supplying hydraulic fluid to said hydraulic means, pressure regulating means for varying the pressure in said line, means for measuring the amplitude of vibration of the beam member produced by the striking of the blades of the rotary element against the bed-knife, and means responsive to changes in the measured amplitude of vibration for operating said pressure regulating means so as to produce a compensating change of pressure in said line upon changes in the measured amplitude.

3. In a cutting apparatus, a rotary element having a plurality of blades extending from the periphery thereof so that the edges of said blades describe a circular path during rotation of said element, a bed-knife for cooperating with the blades of said rotary element, said bed-knife being carried on the free end of a beam member which has a relatively fixed end in addition to the free end, said beam member normally holding said bed-knife in approximately tangential alignment with respect to the circular path described by the blades of said rotary element, cylinder and piston means operatively engaging said beam member between the free end and the relatively fixed end thereof and serving to deflect the free end toward the axis of the roary element to provide a desired amount of interference between the blades of said rotary element and the bed-knife, a line for supplying hydraulic fluid to said cylinder and piston means, means for maintaining a constant volume of fluid in said line, and means responsive to changes in the amount of interference between the blades of the rotary element and the bed-knife to decrease the fluid pressure in said line when the amount of interference increases and to increase the fluid pressure when the amount of interference decreases.

4. In a cutting apparatus, a rotary element having a plurality of blades extending from the periphery thereof so that the edges of said blades describe a circular path during rotation of said element, a bed-knife for cooperating with the blades of said rotary element, said bed-knife being carried on the free end of a beam member which has a relatively fixed end in addition to the free end, said beam member normally holding said bed-knife in approximately tangential alignment with respect to the circular path described by the blades of said rotary element, cylinder and piston means operatively engaging said beam member between the free end and the relatively fixed end thereof and serving to deflect the free end toward the axis of the rotary element to provide a desired amount of interference between the blades of said rotary element and the bed-knife, a line for supplying hydraulic fluid to said cylinder and piston means, means for maintaining a constant volume of fluid in said line, a member movable to different fluid displacement positions within said line to increase and decrease the fluid pressure supplied to said cylinder and piston means, and means responsive to changes in the amount of interference between the blades of the rotary element and the bed-knife to vary the displacement position of said member and produce a compensating change of fluid pressure in said line.

5. In a cutting apparatus, a rotary element having a plurality of blades extending from the periphery thereof so that the edges of said blades describe a circular path during rotation of said element, a bed-knife for cooperating with the blades of said rotary element, said bed-knife being carried on the free end of a beam member which has a relatively fixed end in addition to the free end, said beam member normally holding said bed-knife in approximate tangential alignment with respect to the circular path described by the blades of said rotary element, hydraulic means operating on said beam member between the free end and the relatively fixed end thereof and serving to deflect the free end toward the axis of said rotary element to provide a desired amount of interference between the blades of said rotary element and the bed-knife, a line for supplying hydraulic fluid to said hydraulic means, pressure regulating means for varying the pressure in said line, sensing means in said line for sensing the amplitude of pressure pulses produced in said line by contact of the blades of the rotary element gainst the bed-knife, means controlled by said sensing means for operating said pressure regulating means so as to produce a compensating change of pressure in said line upon changes in the amplitude of the pressure pulses.

6. In a cutting apparatus, a rotary element having a plurality of blades extending from the periphery thereof so that the edges of said blades describe a circular path during rotation of said element, a bed-knife for cooperating with the blades of said rotary element, said bed-knife being carried on the free end of a beam member which has a relatively fixed end in addition to the free end, said beam member normally holding said bed-knife in approximately tangential alignment with respect to the circular path described by the blades of said rotary element, cylinder and piston means operatively engaging said beam member between the free end and the relatively fixed end thereof and serving to deflect the free end toward the axis of the rotary element to provide a desired amount of interference between the blades of said rotary element and the bed-knife, a fluid supply line supplying fluid pressure to said cylinder and piston means, a displacement member movable into and out of said supply line to vary the fluid pressure therein and thereby vary the position of the bed-knife and the amount of interference between the bed-knife and the blades of the rotary element, adjusting means for adjusting the position of said displacement member, and means responsive to the amplitude of pressure pulses produced in said line by contact of the blades of the rotary element against the bed-knife to move said displacement member into said supply line when the pressure pulses in said line decrease in amplitude and out of said line when the pressure pulses increase in amplitude.

7. In a cutting apparatus, a rotary element having a plurality of blades extending from the periphery thereof so that the edges of said blades describe a circular path during rotation of said element, a bed-knife for cooperating with the blades of said rotary element, said bed-knife being carried on the free end of a beam member which has a relatively fixed end in addition to the free end, said beam member normally holding said bed-knife in approximately tangential alignment with respect to the circular path described by the blades of said rotary element, cylinder and piston means operatively engaging said beam member between the free end and the relatively fixed end thereof and serving to deflect the free end toward the axis of the rotary element to provide a desired amount of interference between the blades of said rotary element and the bed-knife, a fluid supply line supplying fluid pressure to said cylinder and piston means, a displacement member movable into and out of said supply line to vary the fluid pressure therein and thereby vary the position of the bed-knife and the amount of interference between the bed-knife and the blades of the rotary element, adjusting means for adjusting the position of said displacement member, sensing means in said supply line for indicating the amplitude of pressure pulses produced in said line by contact of the blades of the rotary element against the bed-knife, transducer means for converting the indications of said sensing means into electrical impulses the amplitude of which is directly proportional to the pressure pulses, and means operated by the electrical impulses from said transducer for operating said adjusting means to move said displacement member into said supply line when the pressure pulses in said line decrease in amplitude and out of said line when the pressure pulses increase in amplitude.

8. In a cutting apparatus, a rotary element having a plurality of blades extending from the periphery thereof so that the edges of said blades describe a circular path during rotation of said elment, a bed-knife for cooperating with the blades of said rotary element, said bed-knife being carried on the free end of a beam member which has a relatively fixed end in addition to the free end, said beam member normally holding said bed-knife in approximately tangential alignment with respect to the circular path described by the blades of said rotary element cylinder and piston means operatively engaging said beam member between the free end and the relatively fixed end thereof and serving to deflect the free end toward the axis of the rotary element to provide a desired amount of interference between the blades of said rotary element and the bed-knife, a fluid supply line supplying fluid pressure to said cylinder and piston means, a displacement member movable into and out of said supply line to vary the fluid pressure therein and thereby vary the position of the bed-knife and the amount of interference between the bed-knife and the blades of the rotary element, fluid pressure operating means for adjusting the position of said displacement member, mechanical sensing means in said supply line for indicating the amplitude of pressure pulses produced in said line by contact of the blades of the rotary element against the bed-knife, transducer means for converting the indications of said mechanical sensing means into electrical impulses the amplitude of which is directly proportional to the pressure pulses, an electrical device, means for feeding said electrical impulses to said electrical device, said device having an output which is increased when the value of said impulses rises above a predetermined amount and decreased when the value of said impulses fall below the predetermined amount, and means connecting the output of said electrical device to said fluid pressure operating means whereby said displacement member is moved into said supply line when the pressure pulses in said line decrease in amplitude and out of said line when the pressure pulses increase in amplitude.

References Cited in the file of this patent

UNITED STATES PATENTS

| 2,586,462 | Forster | Feb. 19, 1952 |
| 2,782,853 | Heffelfinger | Feb. 26, 1957 |